(12) United States Patent
Rancour et al.

(10) Patent No.: US 9,715,896 B2
(45) Date of Patent: Jul. 25, 2017

(54) MODULAR DATA STORAGE DEVICE TESTING SYSTEM

(71) Applicant: Seagate Technology LLC, Cupertino, CA (US)

(72) Inventors: Michael Louis Rancour, Minnetonka, MN (US); Brett Robert Herdendorf, Mound, MN (US); Ronald Eldon Anderson, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/231,374

(22) Filed: Aug. 8, 2016

(65) Prior Publication Data

US 2016/0379681 A1 Dec. 29, 2016

Related U.S. Application Data

(63) Continuation of application No. 14/695,476, filed on Apr. 24, 2015, now Pat. No. 9,412,411.

(51) Int. Cl.

| G11B 7/00  | (2006.01) |
|---|---|
| G11B 20/18 | (2006.01) |
| G11B 15/00 | (2006.01) |
| G11B 19/00 | (2006.01) |
| G11B 25/04 | (2006.01) |

(52) U.S. Cl.
CPC .......... *G11B 20/1816* (2013.01); *G11B 15/00* (2013.01); *G11B 19/00* (2013.01); *G11B 25/043* (2013.01)

(58) Field of Classification Search
None
See application file for complete search history.

(56) References Cited

U.S. PATENT DOCUMENTS

| 4,841,389 A  | 6/1989  | Hoyt |
|---|---|---|
| 5,758,406 A  | 6/1998  | Hunsaker |
| 5,787,057 A  | 7/1998  | Fan |
| 5,894,376 A  | 4/1999  | Rinard |
| 6,271,985 B1 | 8/2001  | Ishikawa |
| 6,286,362 B1 | 9/2001  | Coffman |
| 6,526,841 B1 | 3/2003  | Wanek et al. |
| 7,076,391 B1 | 7/2006  | Pakzad et al. |
| 7,219,028 B2 | 5/2007  | Bae et al. |
| 7,248,039 B2 | 7/2007  | Green et al. |
| 7,295,002 B2 | 11/2007 | Guzik et al. |
| 7,634,375 B1 | 12/2009 | Pakzad et al. |
| 7,778,031 B1 | 8/2010  | Merrow et al. |
| 7,836,603 B2 | 11/2010 | Guzik et al. |
| 7,848,106 B2 | 12/2010 | Merrow |
| 8,102,173 B2 | 1/2012  | Merrow |
| 8,189,334 B2 | 5/2012  | Campbell et al. |
| 8,238,099 B2 | 8/2012  | Merrow |
| 8,432,630 B1 | 4/2013  | Lin et al. |

(Continued)

*Primary Examiner* — Peter Vincent Agustin
(74) *Attorney, Agent, or Firm* — Hall Estill Attorneys at Law (57) ABSTRACT

A data storage device testing system may be configured with at least a test slot, a loader assembly, and an exchange assembly. The loader assembly can be positioned to respectively engage and disengage a test deck with the test slot. The exchange assembly may be configured to open an access port portion of the test deck and subsequently replace a tested data storage component housed within the first test deck with an untested data storage component.

20 Claims, 4 Drawing Sheets

(56) References Cited

U.S. PATENT DOCUMENTS

| | | |
|---|---|---|
| 8,873,200 B2 | 10/2014 | Warn et al. |
| 2002/0035865 A1 | 3/2002 | Luk |
| 2007/0002494 A1 | 1/2007 | Takahashi |
| 2008/0143361 A1 | 6/2008 | Casterton et al. |
| 2009/0142169 A1 | 6/2009 | Garcia |
| 2009/0153994 A1 | 6/2009 | Merrow |
| 2009/0261228 A1 | 10/2009 | Merrow |
| 2009/0297328 A1 | 12/2009 | Slocum, III |
| 2011/0156741 A1 | 6/2011 | Scocchetti |
| 2014/0290023 A1 | 10/2014 | Kay |
| 2014/0306728 A1 | 10/2014 | Arena et al. |

MODULAR DATA STORAGE DEVICE TESTING SYSTEM

RELATED APPLICATION

The present application is a continuation of U.S. patent application Ser. No. 14/695,476 filed Apr. 24, 2015 which issues as U.S. Pat. No. 9,412,411 on Aug. 9, 2016.

SUMMARY

A data storage device testing system, in accordance with some embodiments, has at least a test slot, a loader assembly, and an exchange assembly. The loader assembly is positioned to respectively engage and disengage a test deck with the test slot. The exchange assembly is configured to open an access port portion of the test deck and subsequently replace a tested data storage component housed within the first test deck with an untested data storage component.

DETAILED DESCRIPTION

Increased use of digital computing devices, like smartphones, tablets, and laptops, has elevated the amount of data being generated and shared. Increasingly sophisticated data generation, such as high-resolution digital pictures, along with the heightened sharing of digital content through social media and internet-based cloud computing has elevated the demand for data storage devices. However, current data storage device component testing systems can be inefficient in terms of time, space, and accuracy. Thus, various embodiments provide a modular data storage device testing system that optimizes the concurrent testing of the various components of multiple data storage devices.

It is contemplated that a spinstand system can test a data access component in manual or automated embodiments. Such spinstand systems often test components for less than a minute, which is ineffective at catching low probability failures and they are inefficient as large amounts of unproductive time are spent loading and unloading components to be tested as well as transporting spinstands to and from a testing environment. Hence, spinstand systems do not allow test time scaling efficiently and have reduced testing output per unit of floor space in a factory.

Accordingly, a modular testing system can have a test slot, a loader assembly, and an exchange assembly with the loader assembly positioned to respectively engage and disengage a test deck with the test slot and the exchange assembly configured to open an access port portion of the test deck and subsequently replace a tested data storage component housed within the first test deck with an untested data storage component. The ability to concurrently test multiple different test decks with multiple test slots increases the efficiency of data storage component testing per unit of factory floor space. Also, the ability to modularly exchange a slider portion of a data storage device via the access port portion of the test deck increases component testing efficiency by eliminating any disassembling of the test deck, which contrasts spinstand systems that disassemble a test assembly and replace an entire data access assembly to test a single data storage component.

Figure 1:
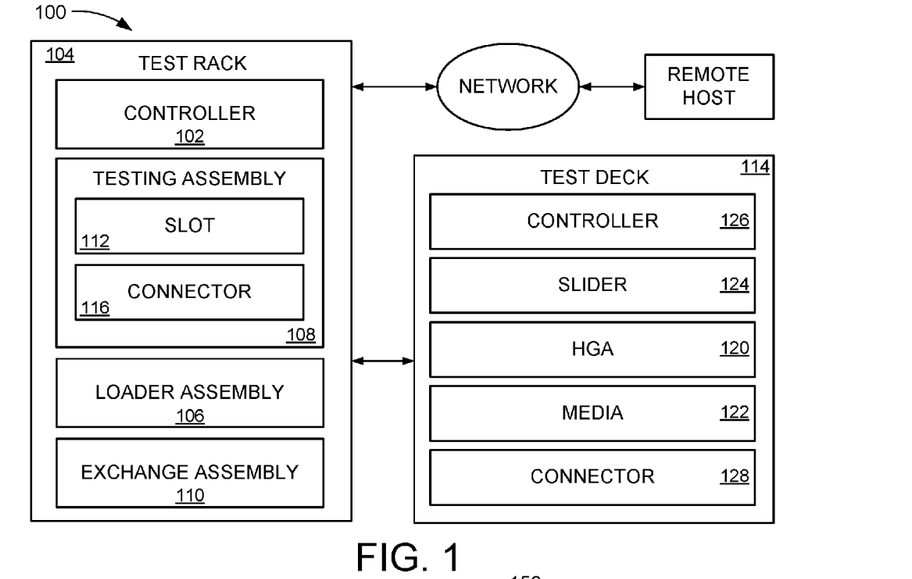
FIG. 1 is a line representation of a portion of an example data storage system configured and operated in accordance with some embodiments.

Although a modular data storage device testing system is not limited to a particular design, number of components, or size, FIG. 1 illustrates block representation of an example modular testing system 100 configured in accordance with various embodiments. The modular testing system 100 has at least one local controller 102 that is housed in a rack 104 along with loader 106, testing 108, and exchange 110 assemblies. The testing assembly 108 has a plurality of test slots 112 that can be arranged vertically and horizontally to efficiently occupy physical space. The various testing slots 112 can have similar or dissimilar sizes and testing capabilities to allow the local controller 102 to simultaneously provide different testing environments for test data storage device components corresponding with different device performance metrics or different conditions, such as temperature, or different testing capabilities to focus on specific tests on a sampled basis.

In some embodiments, the test slots 112 are interconnected via a common cooling duct that can be adjusted to regulate the temperature of a test deck 114 engaged within the test slot 112. In other embodiments, at least one test slot 112 has a local thermal control mechanism that allows the local controller 102 to artificially increase the temperature of one or more test decks 114, which can increase the scope of testing that can be carried out within the test slots 112 or the thermal control mechanism can be integrated into the test deck for maximum control with heating and cooling efficiency.

The loader assembly 106 can have one or more robotic or manual rails, conveyors, end effectors, and elevators that allow individual test decks 114 to be installed and subsequently removed from the respective test slots 112. It is contemplated that the loader assembly 106 can control the position, pitch, and roll of a test deck 114 to allow complete electrical connection of a test slot connector 116 with a test deck connector 118. The ability to simultaneously engage and disengage multiple different test decks 114 with various test slots 112 in the rack 104 allows for efficient testing of large numbers of data storage device components.

The exchange assembly 110 can be configured with any number of manual or robotic means to engage and open an access port 120 portion of a test deck 114 before replacing one or more components housed within the test deck 114. For example, the exchange assembly 110 can remove and replace a data storage medium 122, a head stack, a head gimbal assembly (HGA) that has a slider, or a slider alone in the test deck via an access port 120, which saves testing time and increases testing accuracy over systems that disassemble some, or all, of a testing assembly to interchange data storage device components. That is, the ability to exchange a single data storage device component via the access port 120 provides modular interchangeability that optimizes the efficiency and accuracy of the testing system 100.

Various embodiments configure each test deck 114 with a deck controller 126 that can store at least one testing pattern and/or routine that can be carried out by the test slot 112 to evaluate the quality and accuracy of at least the slider 124 and medium 122. While not required or limiting, configuring each test deck 114 with a controller 126 allows the rack controller 104 to more efficiently conduct simultaneous testing of multiple different test decks 114 compared to the rack controller 104 directing different test patterns and routines for various test decks 114. That is, the individual test decks 114 may, in some embodiments, locally direct testing conditions to the rack controller 102 to allow different test decks 114 to execute different testing conditions, such as test slot 112 temperature, vibration, data writing, data reading, and data erasure conditions, and transducer fly height.

It is noted that the test deck 114 is not a functioning data storage device that can be utilized as a hard drive. In accordance with some embodiments, one or more of the slider 124 and medium 122 data storage components are conditioned for testing the quality and accuracy of other data storage components. For example, the data storage medium 122 can be configured with testing parameters, such as data tracks, data density, servo patterns, and data patterns, which are not conducive to hard drive data storage device media that are ready for the input of consumer data. Hence, although the test deck 114 is enclosed within top and bottom covers that define a sealed or unsealed internal environment like a hard disk drive, the test deck 114 is configured specifically to test one or more data storage components without the ability to store end-user data like a commercial hard disk drive.

Figure 2:
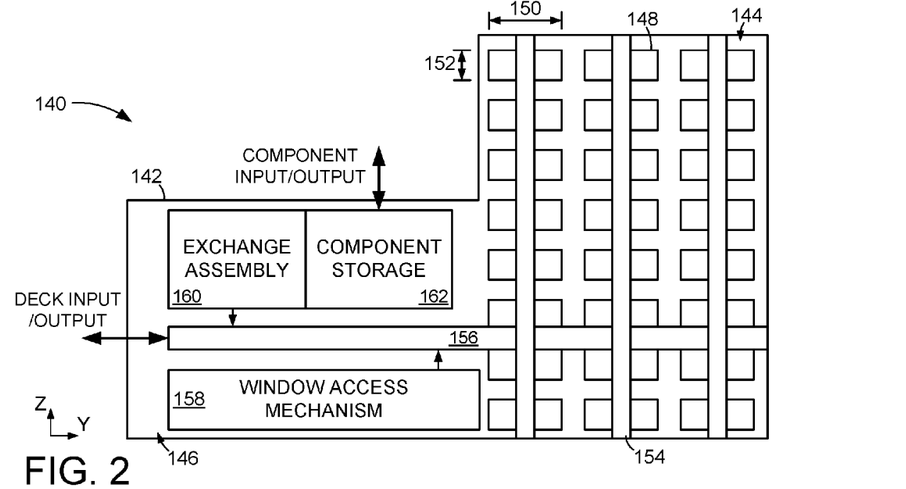
FIG. 2 displays a line representation of a portion of an example data component testing system arranged in accordance with various embodiments.

FIG. 2 displays a line representation of an example modular testing system 140 arranged and operated in accordance with various embodiments to test at least one data storage component. The testing system 140 is modular in the ability to test and replace individual data storage components, like the slider 124 of FIG. 1, without disassembling the entire test deck. The testing system 140 is housed within a rigid testing rack 142 that is arranged to provide at least a testing region 144 and an exchange region 146. The testing region 142 can have a plurality of test slots 148 that are arranged in the rack 142 to maximize testing capacity while providing efficient temperature management through natural and artificial airflow.

The test slots 148 of the test region 144 can be similar or dissimilar in structure and operation. That is, test slots 148 can have matching, or different, widths 150 and heights 152 as well as matching, or different, testing components to allow a diverse variety of testing environments, measurement devices, and electrical interconnections for a test deck. For example, a first test slot 148 may have a larger width 150 and/or height 152 than a second test slot 148 in the test region 144 and the first test slot may have components allowing for heating and cooling a test deck while the second test slot may be configured only for cooling a test deck. The ability to configure the various test slots 148 with similar or dissimilar sizes and capabilities allows the testing system 140 to concurrently test under a wide range of different conditions, such as temperature and vibration.

The assorted test slots 148 are accessed by a loader assembly that comprises one or more locating means 154, such as, but not limited to, belts, conveyors, end effectors, paths, and tracks. In some embodiments, multiple independent locating means 154 communicate with an exchange mechanism 156 to allow a plurality of different test decks to be transported to and from the various test slots 148 simultaneously. The ability to concurrently have multiple different test decks being moved and tested increases the efficiency of the testing system 140 and allows the test slots 148 to conduct different testing routines that take different test times without hampering overall testing efficiency.

The exchange mechanism 156 is configured to position a test deck so that a port access mechanism 158 can efficiently open a port portion of the test deck. For example, the exchange mechanism 156 can orient each test deck so that a port portion is facing the port access mechanism 158 to allow a door occupying the port portion of the test deck to be moved and/or removed by the port access mechanism 158. The interaction of the test deck with the port access mechanism 158 prepares the test deck to be swapped by the exchange assembly 160. In other words, the port access mechanism 158 opens the test deck to allow the exchange assembly to remove and replace some of the data storage components of the test deck.

As shown, the exchange assembly 160 can be fed individual data storage components to be tested by a storage region 162. With a plurality of test decks being tested and engaging the exchange assembly 160, the storage region 162 can be configured to organize and correlate the input and output of individual data storage components. For instance, the storage region 162 can correlate the input of an untested slider component with a specific test deck while designating a tested slider component as defective or certified and ready for output to data storage device manufacturing.

The capability to process individual data storage components allows the testing system 140 to not only test the function of a data storage component, but also optimize the performance of the data storage component. As a non-limiting example, the testing system 140 can install a single data storage component into multiple different test decks that respectively test different data access conditions, like temperature, and different computing combinations, such as HGA, slider, medium combinations, to discover the optimized data storage environment for that specific data storage component. As such, the testing system 140 goes beyond merely testing for defects and allows for the optimization of computing performance for a data storage component.

Figure 3:
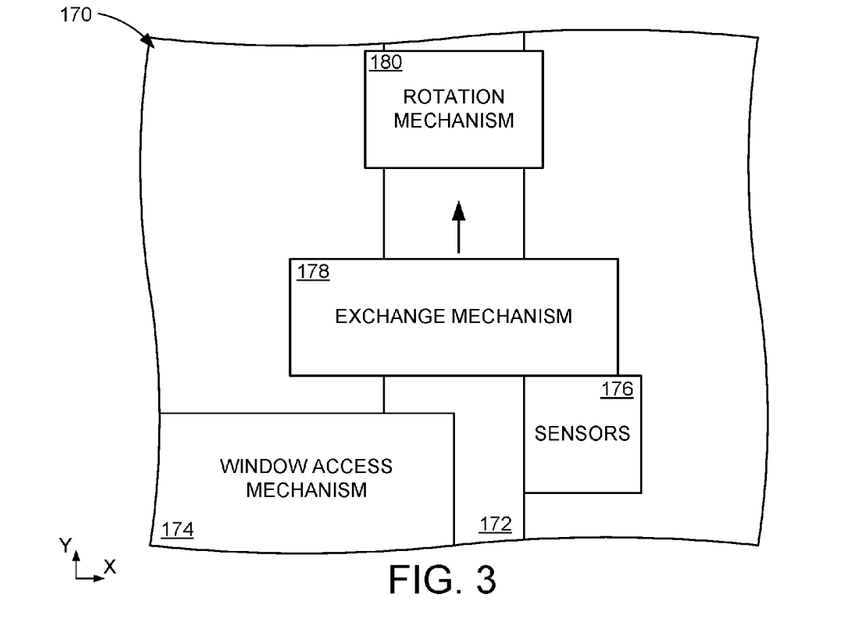
FIG. 3 shows a top view block representation of a portion of an example exchange assembly that may be utilized in accordance with various embodiments.

FIG. 3 displays a top view block representation of an example exchange assembly 170 that can be utilized in the testing systems 100 and 140 in accordance with various embodiments. The exchange assembly 170 can have one or more positioning means 172, such as a belt, conveyor, and rail, that orient and move a test deck in relation to a port access mechanism 174, at least one sensor 176, an exchange mechanism 178, and a rotation mechanism 180.

The port access mechanism 174 can be configured with any number of end effectors that can operate individually and collectively to open and close a port portion of a test deck. It is contemplated that multiple end effectors with different configurations can operate to sequentially engage, unlock, and remove at least one door that covers the port portion of the test deck. The port access mechanism 174 may further be configured to concurrently close a port portion of a first test deck while opening a port portion of a second test deck. Hence, the port access mechanism 174 can service test decks with previously tested data storage components that are to be exchanged by the exchange mechanism 178 and service test decks with newly installed data storage components.

Any number of sensors 176 can be positioned throughout the exchange assembly 170 to identify and verify the position and condition of test decks as well as the exchange assembly 170. The utilization of multiple different types of sensors 176, such as optical, proximity, vibration, and temperature sensors, can detect actual and potential data storage component exchange issues while verifying the position and condition of test decks having data storage components exchanged. A plurality of sensors, in some embodiments, is dedicated to the verification of data storage component exchange by one or more exchange end effectors of the exchange mechanism 178.

While not required, the exchange mechanism 178 can have a multi-tip end effector that can be programmed to sequentially or concurrently engage a test deck to disconnect and remove a first data storage component before installing and connecting a second data storage component into the test deck. As an example, the exchange mechanism 178 can concurrently uninstall a tested slider component from a test deck while preparing a second slider component for installation and subsequent testing as part of the test deck. The automated installation of an individual data storage component advances to the rotation mechanism 180 where test decks are either outputted from a testing system or rotated towards the port access mechanism 174 to be closed and then tested in a test slot. The rotating mechanism can operate in multiple planes and with different positioning means 172 to allow efficient translation of test decks from the exchange mechanism 178 back to the port access mechanism 174.

Figure 4:
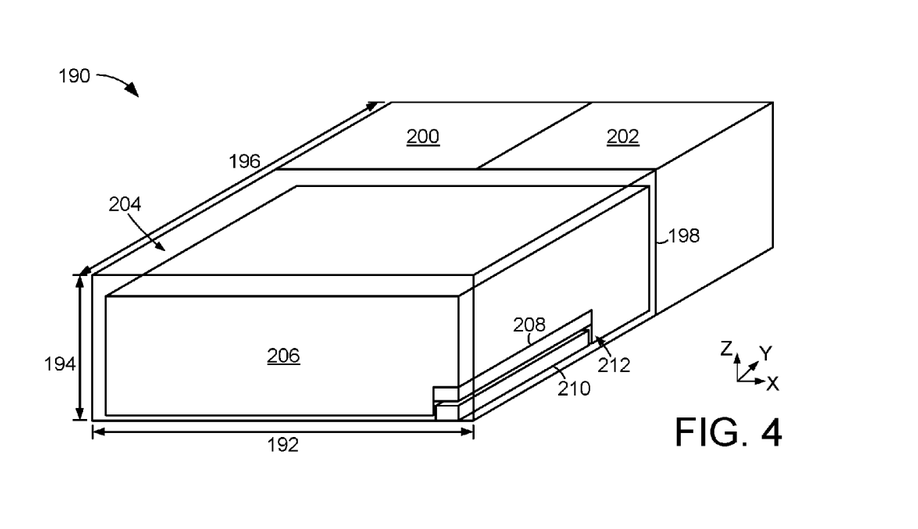
FIG. 4 is an isometric line representation of an example test slot that can be employed in the data component testing system of FIG. 2.

FIG. 4 illustrates an isometric line representation of portions of an example test slot 190 that may be utilized in a testing system in accordance with various embodiments to test individual data storage components. The test slot 190 may be any shape, such as square, rectangular, and semicircular, defined by uniform or varying widths 192, heights 194, and depth 196 dimensions. The assorted dimensions can be arranged to provide a midplane 198, first auxiliary region 200, and second auxiliary region 202, and testing region 204 that partially or completely surrounds a test deck 206.

Although not required or limiting, the midplane 198 may be a fixed or moveable connector, printed circuit board, or baffle that separates the testing region 204 from the auxiliary regions 200 and 202. The first 200 and second 202 auxiliary regions can individually and collectively house any number of environmental components, such as a heater, cooling duct, vibration inducing mechanism, and humidity alteration unit, as well as any number of sensing components, such as temperature, optical, and vibration sensors. Configuring the auxiliary regions 200 and 202 can allow the test slot 190 to test, monitor, and log a diverse variety of test deck 206 operating conditions. It is noted that the auxiliary regions 200 and 202 may be open to the testing region 204 to allow airflow to and from the test deck 206.

The midplane 198 may have one or more electrical busses and connectors that interact with the test deck 206 via force applied along the Y axis. That is, a test deck connector 208 can be positioned to interconnect with the midplane 198 through sliding engagement along the Y-X plane. However, such sliding engagement can be inconsistent and jeopardize the integrity of the test deck connector 208 due to excess force used to engage or disengage the test deck 206. Accordingly, the test region 204 can have a floor mounted connector 210 that electrically interconnects with a recessed notch 212 and connector 208 of the test deck 206 via gravity. The utilization of gravity along the Z-X plane instead of sliding force along the Y-X plane can increase connection reliability and speed as the weight and shape of the test deck 206 is utilized.

It is contemplated that each test slot 190 in a testing system operates independently. As such, the various components and capabilities of the auxiliary regions 200 and 202 as well as the operating capabilities of the test deck 206 can function dissimilarly than a physically adjacent test slot 190 in a testing system. For example, a local test controller resident on the test deck 206 can direct the auxiliary regions 200 and 202 to heat and/or cool the test deck 206 while a test routine is conducted to evaluate a data storage component inside the test deck 206. The ability to conduct independent test slot 190 operation in conjunction with data storage component testing operations allows a plurality of test slots 190 to efficiently conduct component testing compared to all test slots 190 executing the same testing routine.

Figure 5A:
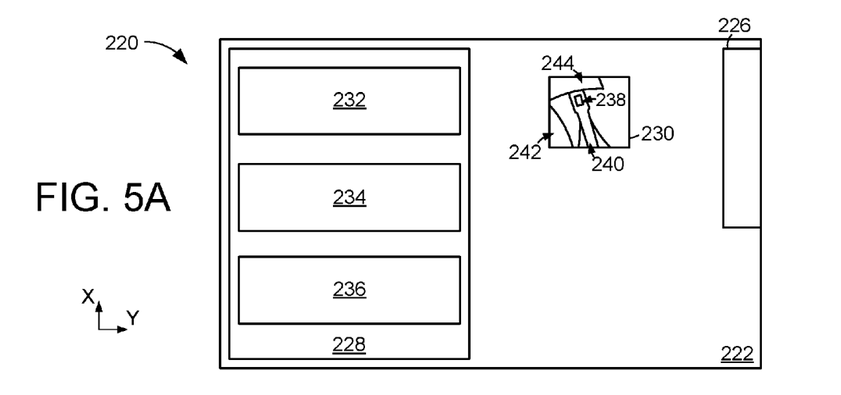
FIGS. 5A and 5B respectively illustrate line representations of portions of an example test deck arranged in accordance with various embodiments.
Figure 5B:
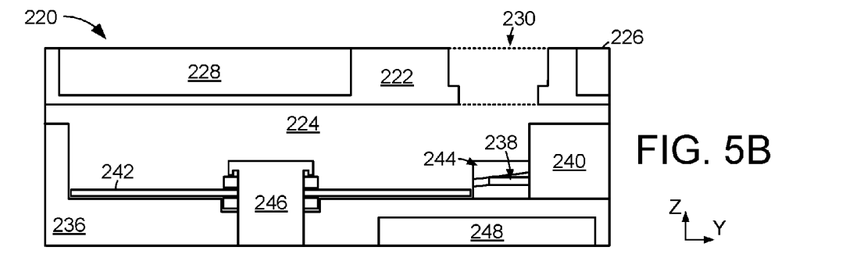

FIGS. 5A and 5B respectively show top and cross-section line representations of various portions of an example test deck 220 that is employed in some embodiments to test a data storage component. FIG. 5A illustrates a top cover 222 of the test deck 220. The top cover 222 may be configured as one or more rigid members interconnected to enclose an internal testing environment 224, as displayed in FIG. 2B. The top cover 222 can have an electrical connector 226, such as a bus, a printed circuit board assembly (PCBA) 228, and an access port 230. Various embodiments configure the PCBA 228 at least with a local controller 232, memory 234, and one or more sensors 236 that direct testing operations in the testing environment 224.

The access port 230 can be any size and position on the test deck 220 and is not limited to the top cover, as shown. Regardless of where the access port 230 is located, the access port 230 can be configured to allow a data storage component to be removed and installed without separating the top cover 222 from the bottom cover 236. For example, the access port 230 is arranged to allow one or more exchange end effectors to remove and replace a first data storage component, such as a slider 238, actuator assembly 240, data storage medium 242, and ramp 244, with a second data storage component. That is, the access port 230 can provide room to electrically and mechanically disconnect and connect different data storage components.

Turning to the cross-section view of FIG. 5B, the top cover 222 is mated with the bottom cover 236 to seal the testing environment 224 that is occupied by a single data storage medium 242, ramp 244, actuating assembly 240, slider 238, and spindle 246. The configuration of the test deck 220 with an individual slider 238, medium 242, and actuating assembly 240 reduces the test deck's 220 size and complexity while allowing modular exchange of data storage components to test for defects as well as optimize the combination of data storage components for performance and/or reliability. It is noted that the second PCBA 248 positioned in the bottom cover 236 is not required, but illustrates where a PCBA can be located and that multiple PCBAs can be concurrently utilized in a test deck 220.

The access port 230 may be configured with a closure means that can be selected by an exchange assembly to expose or seal the testing environment 224. The closure means can be a variety of different components that occupy the port region 250, as shown by segmented line 252. In some embodiments, the access port 230 closure means is a threaded plug, friction fitting, hinged door, keyed plate, or spring-loaded assembly that can be efficiently engaged, installed, and removed by an exchange assembly portion of a testing system.

Figure 6:
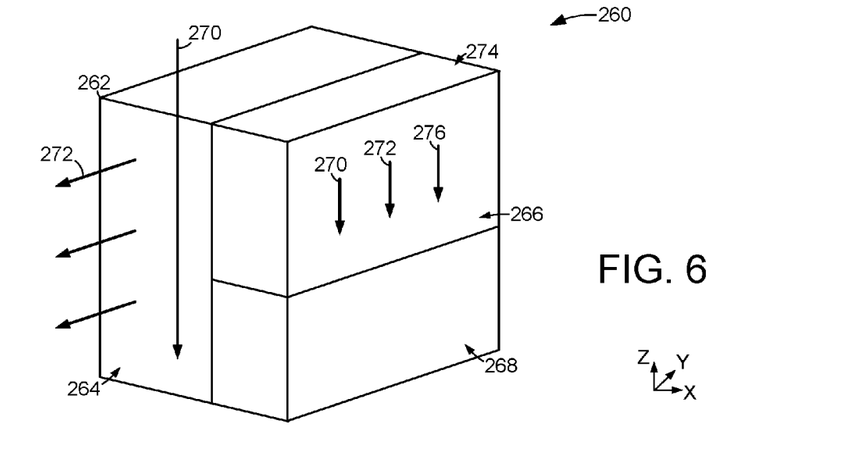
FIG. 6 displays a block representation of an example data storage device testing system operated in accordance with some embodiments.

FIG. 6 depicts a line representation of a portion of an example testing system 260 conducting a test routine in accordance with assorted embodiments. The testing system has a rigid frame 262 that defines a test rack region 264, component exchange region 266, and component storage region 268. The testing system 260 is configured to efficiently provide airflow to the various regions to remove particulate contamination and stabilize thermal operation despite the various testing means generating heat.

The testing system 260, in various embodiments, ensures different airflow rates for the different regions, as displayed by solid arrows. The testing system 260 can have a first convective airflow 270 that naturally or artificially falls over the frame 262 and the respective regions. The convective flow 270 can be augmented by pressure or vacuum to provide forced flow 272 at least in the test rack region 264. The forced flow 272 can be oriented to be any angle with respect to the convective flow 270, which can be aided by one or more cooling ducts piped through the test rack region 264. It is noted that one more fans and/or pumps can be used to accelerate the convective flow 270 to a forced flow speed, such as 0.25-1.14 m/s. The test rack region 264 can have forced flow 272 that is independent of the exchange region 264 and is configured to provide thermal stability of 1-4° C. and an operating temperature of 30-50° C.

The frame 262, in various embodiments, has one or more filters spanning roof 274 of the frame 262 in the Y-X plane while other embodiments utilize a multitude of different filters positioned along different planes on the frame 262. The exchange forced flow 276 can have a speed of 0.3-0.7 m/s to provide cleanliness and ensure optimal operating temperatures. The ability to control naturally falling convective flow 270 in both direction and speed allows the different regions 264, 266, and 268 to have airflow catered to the specific thermal and contaminant controls posed by the respective testing, storage, and component exchange functions.

Figure 7:
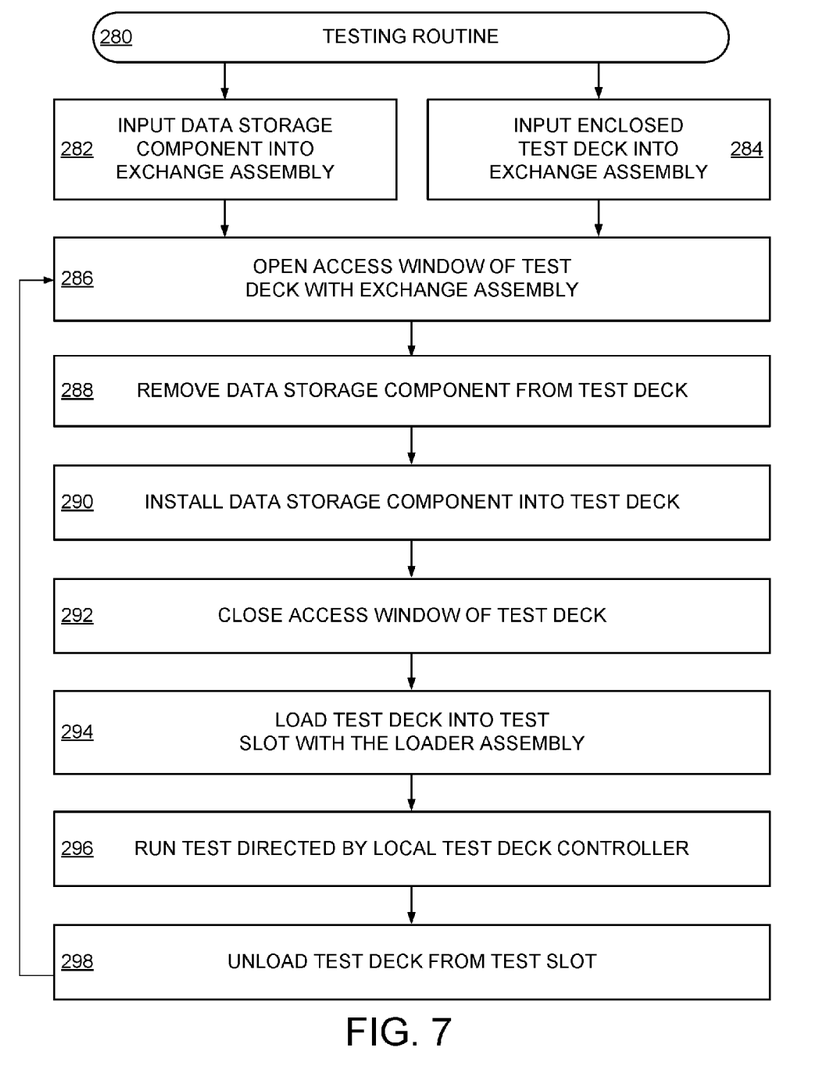
FIG. 7 plots an example testing routine carried out in accordance with assorted embodiments.

While a test slot, test deck, and data storage component can be utilized in an unlimited variety of manners, assorted embodiments employ the testing routine 280 of FIG. 7 with a testing system arranged in accordance with various embodiments. The testing routine 280 begins by positioning a plurality of test slots in a common test rack that is accessed by a loading assembly that transitions test decks between an exchange assembly and the various test slots. With the test system in place within a rigid frame, step 282 inputs at least one data storage component into an exchange assembly before, during, or after step 284 inputs a test deck into the exchange assembly.

It is noted that the test deck enters the exchange assembly manufactured to enclose a testing environment that is accessed by a port region of the top or bottom covers of the test deck in step 286. That is, the top and bottom covers of the test deck are connected to define the internal testing environment that is exposed to the exchange assembly via the access port. Step 286 can utilize one or more end effectors to engage and remove a door or plate covering the port region. Next, step 288 engages and removes at least one data storage component from the internal testing environment of the test deck. As a non-limiting example, step 288 can electrically and mechanically disconnect and remove a slider assembly from the test deck while keeping the data storage medium and actuating assembly portions of the test deck intact in the internal testing environment.

The removal of the data storage component in step 288 allows step 290 to install a different data storage component into the test deck. It is contemplated that steps 288 and 290 are conducted with different end effectors to increase the efficiency of exchanging the data storage components. With the testing components in place and operable, step 292 proceeds to close the access port of the test deck to seal the internal testing environment and prepare it for being loaded into a test slot by a loader assembly. The closed test deck from step 290 may, in some embodiments, advance along multiple directions to reach a test slot. The loading of the test deck in step 294 may involve physically engaging an electrical connector of the test deck with at least one test slot connector.

In step 296, a local test deck controller executes a test protocol that can write and read any number and type of data patterns to a data storage medium in the test deck. The test protocol in step 296 may utilize a system controller to conduct environmental testing, such as vibration, heating, cooling, and combinations thereof. Conclusion of the test protocol in step 294 can determine if an electrical component has a defect, the component's operational tolerances, and the component's performance when paired with the other data storage components of the test deck. As such, step 294 can identify if a data storage component is to be discarded, certified as good, or qualified for use in a different data accessing combination. The ability to identify not only that a data storage component is good or defective, but how the component performs in combination with other data storage components allows the testing routine 280 to optimize data storage performance by matching data storage components with similar tolerances and responses to environmental variations.

Routine 280 advances to step 298 to unload the test deck from the test slot by the loading assembly, which can involve disconnecting the test deck and test slot connectors before moving the test slot to a port access mechanism of an exchange assembly portion of the testing system where step 286 is revisited. It is noted that the testing routine 280 is not required or limiting as various aspects can be changed and removed just as steps and decisions can be added. For example, assorted embodiments may replace multiple, but less than all, the data storage components in a test deck during steps 288 and 290.

With a testing system configured with testing, loading, and exchange assemblies in accordance with the various embodiments, multiple test decks can be efficiently tested and individual data storage components can be modularly swapped without having to completely disassemble the test deck. The configuration and operation of the access port portion of a test deck allows an exchange assembly to efficiently access, remove, and replace a single data storage component. Configuring each test deck with a local controller allows test protocol to be independently conducted for each test deck that may involve cycling environmental parameters to determine the quality and performance of the individual data medium, slider assembly, HGA, and actuating assemblies of the test deck.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A method comprising:
positioning a test slot, a loader assembly, and an exchange assembly in a testing rack;
opening an access port portion of a test deck with the exchange assembly without separating top and bottom covers of the test deck;
replacing a first individual data storage component with a second individual data storage component with the exchange assembly as directed by a rack controller of the testing rack;
closing the access port portion of the test deck with the exchange assembly;
engaging the test deck with a test slot with the loader assembly; and
conducting a data component test with the test deck and test slot as directed by a deck controller of the test deck.

2. The method of claim 1, wherein the test slot is adapted to provide a plurality of different temperatures to the test deck.

3. The method of claim 1, wherein the exchange assembly comprises first and second end effectors that respectively open the access port portion and replaces the slider assembly.

4. The method of claim 3, wherein the loader assembly comprises a third end effector that engage and disengage the test deck with the test slot.

5. The method of claim 1, wherein the test deck comprises a housing defined by the top and bottom covers that encloses a single data storage medium and a single data access assembly.

6. The method of claim 1, wherein the data storage component comprises a transducing head or a head gimbal assembly.

7. A apparatus comprising a test rack having a rack controller, first test slot, exchange assembly, and a loader assembly, the loader assembly comprising at least one horizontal conveyor and a vertical actuator configured to move a test deck to and from the first test slot to an exchange assembly, the exchange assembly configured to open an access port portion of the test deck as directed by the rack controller and replace a slider assembly housed within the test deck, the first test slot configured to test the slider assembly as directed by a deck controller of the test deck.

8. The apparatus of claim 7, wherein the first test slot has a barrier to protect against electromagnetic interference, thermal disturbances, and acoustic disturbances.

9. The apparatus of claim 7, wherein the deck controller is different and independent of the rack controller.

10. The apparatus of claim 7, wherein the first test slot is positioned in vertical alignment with a second test slot, the first and second test slots each accessed by a single vertical actuator.

11. The apparatus of claim 10, wherein the first and second test slots are connected via a cooling duct adapted to provide cooling to each test slot.

12. A method comprising:
engaging first and second test decks with respective first and second test slots via a loader assembly in a test rack, each test deck have an independent deck controller;
conducting first and second data component tests with the respective first and second test slots as directed by the respective deck controllers;
opening an access port portion of the first test deck with an exchange assembly as directed by a rack controller of the test rack; and
replacing a first tested slider assembly housed within the first test deck with a first untested slider assembly via an exchange assembly as directed by the rack controller.

13. The method of claim 12, wherein the replacing step is conducted while the second deck is under test in the second test slot.

14. The method of claim 12, wherein the first tested slider assembly is replaced with the first untested slider assembly in response to the first tested slider assembly passing a least one data component test.

15. The method of claim 12, wherein the second test deck comprises a second tested slider assembly, the second tested slider assembly replaced with a second untested slider assembly in response the second tested slider assembly having a lower performance metric than the second tested slider assembly.

16. The method of claim 12, wherein the first and second data component tests have different test times.

17. The method of claim 12, wherein the first and second data component tests have different testing temperatures.

18. The method of claim 12, wherein a data storage medium and actuator remain enclosed within the first test deck while the first tested slider assembly is removed and replaced in the first test deck.

19. The method of claim 12, wherein the first test deck repeatedly is tested, opened, and engaged to replace a tested slider assembly with an untested slider assembly.

20. The method of claim 12, wherein the exchange assembly loads a second untested slider assembly into the second test deck while the first test deck is under test, the second test deck comprising a data storage medium and actuator without a slider assembly prior to the second untested slider assembly being loaded.

* * * * *